United States Patent
Zhang et al.

(10) Patent No.: US 11,985,363 B2
(45) Date of Patent: May 14, 2024

(54) AUTOMATICALLY DETERMINING PARAMETER VALUES

(71) Applicant: Google LLC, Mountain View, CA (US)

(72) Inventors: Wenbo Zhang, Mountain View, CA (US); Son Khanh Pham, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/802,814

(22) PCT Filed: Aug. 27, 2021

(86) PCT No.: PCT/US2021/047957
§ 371 (c)(1),
(2) Date: Aug. 26, 2022

(87) PCT Pub. No.: WO2023/027728
PCT Pub. Date: Mar. 2, 2023

(65) Prior Publication Data
US 2023/0269403 A1 Aug. 24, 2023

(51) Int. Cl.
*H04N 21/234* (2011.01)
*H04N 21/25* (2011.01)
*H04N 21/442* (2011.01)

(52) U.S. Cl.
CPC ......... *H04N 21/234* (2013.01); *H04N 21/251* (2013.01); *H04N 21/44213* (2013.01)

(58) Field of Classification Search
CPC .......... H04N 21/23418; H04N 21/251; H04N 21/23412
See application file for complete search history.

(56) References Cited

U.S. PATENT DOCUMENTS

| 7,403,911 | B2 | 7/2008 | Guler et al. |
| 10,311,467 | B2 | 6/2019 | Ghavamzadeh et al. |

(Continued)

FOREIGN PATENT DOCUMENTS

| CN | 109831684 | 5/2019 |
| WO | WO 2021/118557 | 6/2021 |

OTHER PUBLICATIONS

International Search Report and Written Opinion in International Appln. No. PCT/US2021/047957, dated May 19, 2022, 15 pages.

(Continued)

*Primary Examiner* — Jason Salce
(74) *Attorney, Agent, or Firm* — Fish & Richardson P.C.

(57) ABSTRACT

Methods, systems, and apparatus, including computer programs encoded on a computer storage medium, for automatically determining parameter values that control or affect provision of content by a content platform. In one aspect, evaluation points are identified for a parameter. Each evaluation point includes an evaluated parameter value of the parameter and a metric value of a metric corresponding to the provision of digital components by the content platform. A first model is generated using the set of evaluation points. A second model is generated based on the first model and an acquisition function that is based on mean values and confidence intervals of the first model and a configurable exploration weight that controls a priority of exploration for evaluating the parameter. A next parameter value to evaluate is determined from the second model and the content platform is configured to use the next parameter value to provide digital components.

20 Claims, 6 Drawing Sheets

(56) References Cited

U.S. PATENT DOCUMENTS

| | | | |
|---|---|---|---|
| 10,515,381 B2 | 12/2019 | Beloi et al. | |
| 10,771,855 B1* | 9/2020 | Joliveau | H04N 21/4424 |
| 10,915,567 B1* | 2/2021 | Zhang | G06F 16/907 |
| 11,062,346 B2* | 7/2021 | Kveton | G06Q 30/0242 |
| 11,074,313 B2* | 7/2021 | Duan | G06F 16/957 |
| 11,748,439 B2* | 9/2023 | Kooznetsoff | G06N 5/022 |
| | | | 707/748 |
| 2005/0251444 A1 | 11/2005 | Varian et al. | |
| 2006/0149622 A1 | 7/2006 | Baluja et al. | |
| 2013/0174045 A1 | 7/2013 | Sarukkai et al. | |
| 2015/0066630 A1* | 3/2015 | Ge | G06Q 30/0244 |
| | | | 705/14.43 |
| 2015/0082345 A1 | 3/2015 | Archer et al. | |
| 2015/0333986 A1 | 11/2015 | Pang et al. | |
| 2016/0127776 A1 | 5/2016 | Zilberstein et al. | |
| 2017/0272809 A1 | 9/2017 | Stuckman | |
| 2017/0366496 A1* | 12/2017 | Habermehl | H04L 51/226 |
| 2018/0365295 A1 | 12/2018 | Paff et al. | |
| 2019/0080019 A1* | 3/2019 | Young | G06F 16/9537 |
| 2019/0260823 A1* | 8/2019 | Brandstetter | H04L 67/10 |
| 2019/0268249 A1* | 8/2019 | Aygun | H04L 43/08 |
| 2020/0314490 A1 | 10/2020 | Kaliouby et al. | |
| 2021/0065064 A1* | 3/2021 | Xu | G06F 18/2113 |
| 2021/0089602 A1* | 3/2021 | Basu | H04L 67/306 |
| 2022/0366692 A1* | 11/2022 | Weerasinghe | H04N 21/812 |

OTHER PUBLICATIONS

Notice of Allowance in Japanese Appln. No. 2022-551712, dated Nov. 27, 2023, 5 pages (with English translation).

* cited by examiner

```
 1:   m = number of trail per round
 2:   k = number of experiment rounds.
 3:   gamma = exploration bias
 4:   data_points = [ ]

// get m first random data points
 5:   new_trials = [ ]
 6:   for i in range(m)
 7:       Sample x[i] from X
 8:       Add x[i] to new_trials
 9:   Run experiments with new_trials and get y1, y2, ... ym.
10:   Add (x1, y1), (x2, y2), ... (xm, ym) to data points
11:   Repeat k-1 times:
          // Create a GP model that fits all the current data points.
12:       gp.fit(data_points)
13:       new_trials = [ ]
14:       temp_data_points = clone(data_points)
15:       gp_temp = clone(gp)
16:       for i in range(m):
              // Suggest the most optimistic point based on the temp model suggestion.
17:           ucb(x) = gamma * std(gp_temp(x)) + mean(gp_temp(x))
18:           x[i] argmax ucb(x)
19:           Add x[i] to new_trials
              // Add the most optimistic prediction of the sampled point, and then
              // fit another model to suggest the next point
20:           Add (x[i], ucb(x[i])) to temp_data_points
21:           gp_temp.fit(temp_data_points)
22:       Run experiments with new_trials and get y1, y2, ... ym
23:       Add (x1, y1), (x2, y2), ... (xm, ym) to data_points
24:       Adjust gamma
```

FIG. 4

AUTOMATICALLY DETERMINING PARAMETER VALUES

CROSS-REFERENCE TO RELATED APPLICATION

This application is a National Stage Application under 35 U.S.C. § 371 of International Application No. PCT/US2021/047957, filed on Aug. 27, 2021. The disclosure of the prior application is considered part of and is incorporated by reference in its entirety into the disclosure of this application.

BACKGROUND

This specification generally relates to data processing as well as automatically determining parameter values that control or affect provision of content by a content platform.

Videos that are streamed to a user can include one or more digital components that are generally overlaid on top of the original video stream. The overlaid content may be provided to the user within a rectangular region that overlays a portion of the original video screen. The digital components can also include in-stream content that is played before, during, or after the original video stream. Provision of videos and digital components can be controlled by a content platform (e.g., a video system) based on parameter values of a variety of parameters, such as a time spacing between presentation of multiple digital components that are presented with a video, a frequency or likelihood of selecting different types of digital components, or other types of parameters.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files. For example, the digital component may be content that is intended to supplement content of a video or other resource. More specifically, the digital component may include digital content that is relevant to resource content (e.g., the digital component may relate to a topic that is the same as or otherwise related to the topic/content on a video). The provision of digital components can thus supplement, and generally enhance, the web page or application content.

SUMMARY

In general, one innovative aspect of the subject matter described in this specification can be embodied in methods including the operations of: executing a plurality of iterations to identify a parameter value for a parameter based on which a content platform controls provision of digital components with video content, wherein executing each iteration in the plurality of iterations includes: identifying a set of evaluation points for the parameter, wherein each evaluation point includes an evaluated parameter value of the parameter and a metric value of a metric corresponding to the provision of digital components by the content platform, wherein the metric value of an evaluation point is determined from data generated by the content platform using the evaluated parameter value of the evaluation point to provide digital components; generating a first model using the set of evaluation points; generating mean values and confidence intervals of the first model; generating a second model based on the first model and an acquisition function, wherein the acquisition function is based on the mean values of the first model, the confidence intervals of the first model, and a configurable exploration weight that controls a priority of exploration for evaluating the parameter; determining, from the second model, a next parameter value to evaluate; configuring the content platform to use the next parameter value to provide digital components with the video content; and determining a next metric value based on data that results from the content platform using the next parameter value to provide digital components; and determining, from among the parameter values for the parameter and corresponding metric values determined during the plurality of iterations, a particular parameter value that either results in a highest metric value or satisfies a particular threshold; configuring the content platform using the particular parameter value to control or select, during production, digital components that are provided with the video content. Other embodiments of this aspect include corresponding methods, apparatus, and computer programs, configured to perform the actions of the methods, encoded on computer storage devices. These and other embodiments can each optionally include one or more of the following features.

Particular embodiments of the subject matter described in this specification can be implemented to realize one or more of the following advantages. The techniques described in this specification provide, e.g., a parameter tuning system that can automatically tune parameters of another system, such as a content platform. The content platform may have, for example, hundreds or even thousands of parameters (e.g., a parameter that controls a time spacing between presentation of digital components, a parameter that represents a likelihood of selecting a certain type of digital component). Manually tuning each parameter may not be feasible. Accordingly, automatic tuning of parameters by the parameter tuning system can enable tuning of a larger number of parameters than is possible with manual tuning approaches. The content platform may have access to limited resources, such as data storage, processor time, administrator time, real-time experiment data, and network bandwidth, to name a few examples. Limited resources means that a limited number of experiments can be conducted for the content platform to determine effects (e.g., metric values) that may result from the content platform providing content while configured using particular parameter values. Accordingly, brute force methods of evaluating every possible parameter value are not feasible. With hundreds of parameters, each having multiple parameter value options, a combinatorial explosion can occur in which a brute force method would need to include evaluation of an infeasible number of parameter value options. That is, the limited resources of the content platform for experimentation would be exhausted before all of the possible parameter values are evaluated. Other approaches, such as random evaluation of parameter values can be inefficient because parameter values that do not result in desired metric values may continue to be selected for evaluation, despite not being good parameter value candidates. For example, with random selection of parameter values, parameter values that are close together may be selected, which wastes resources since evaluating similar parameters generally produces little value with regards to determining better parameter values. A better parameter value as used in this specification is a parameter value that result in a better metric value being derived from data generated by the content platform while configured the parameter value, as compared to a worse metric value that is derived from data generated by the content platform while configured with a different parameter value. Better metrics values are metric values that are more preferred or more desirable (as compared to other metric values) by a provider of the content platform and/or an entity that uses the content platform. A better metric value may correspond to a goal of the content platform or an entity that uses the content platform. Entity goals are described in more detail below. A better metric value can be a value achieved when the content platform is configured with a particular parameter value, as compared to a worse metric value that is achieved when the content platform is configured with a different parameter value.

In contrast, the parameter tuning system described in this specification can select parameter values to evaluate by automatically and iteratively selecting parameter values based on an acquisition function that, e.g., identifies parameter values with the highest predicted metric values (relative to metric values corresponding to other parameter values) and/or parameter values with a highest potential (relative to other parameter values) in terms of being included in as-yet unexplored parameter value spaces. The selection process used by the parameter tuning system can result in better parameter values being selected for evaluation (and implementation) more quickly than may be achieved from brute force or random methods. By selecting better parameter values more quickly, less experiments need to be conducted to determine the better parameter values, and therefore resources consumed by the content platform from running experiments for evaluating selected parameters can be reduced. In this manner, the selection of parameter values by the parameter tuning system can result in faster configuration of the content platform with better parameter values and improved resource efficiency (relative to other methods, such as the brute force or random methods).

In addition to saving resources due to less experimentation, configuring the content platform with better parameter values can also result in resource reduction or savings for the content platform once the content platform is configured using the parameter values as determined, e.g., by the parameter tuning system, using the above described techniques (as further described throughout this specification). For instance, example metrics may include a video abandon rate that indicates a rate of users abandoning a video and a view through rate that indicates a rate at which users view a digital component that is presented with a video. The parameter tuning system can automatically determine, using the above-described selection process (which is further described throughout this specification), new parameter values for one or more parameters (e.g., a time spacing parameter for digital components) that, once configured in the content platform, result in generation of better video abandon rate and view through rate metrics. For some metrics, better metric values correlate to more efficient utilization. For example, for the video abandon rate and digital component view through rate metrics, resource expenditure by the content platform may be more efficient after the content platform is configured with the new parameter values that have been selected/determined (e.g., by the parameter tuning system) to result in a better video abandon rate or better digital component view through rate. In this example, the efficient resource expenditure is achieved because video content and digital components that are provided are more likely to be consumed, as compared to a time period before the new parameter values were configured. In other words, processing cycles, network bandwidth, and other resources that are expended in providing the video content and digital components is more resource-efficient, since a likelihood of client devices receiving the video content and digital components without the user consuming the video content and digital components is reduced.

As another example, the parameter tuning system can select better parameter values that, once configured in the content platform, result in generation of better resource-specific metric values such as for latency-specific metrics such as latency of providing video content or digital components to a user device. For example, the parameter tuning system can determine parameter values that, if implemented, will result in lower latency-specific metric values as compared to a time period before implementation of the parameter values. As another example, the parameter tuning system can select better parameter values that, once configured, result in generation of certain metric values such as an overall digital component interaction count in a particular time period that can be achieved by providing fewer digital components as compared to a same overall digital component interaction count that was previously achieved in a previous time period when the content platform was configured using previous parameter values. For example, the parameter tuning system can select parameter values that, once configured in the content platform, result in selection by the content platform of digital components that are interacted with at a higher rate as compared to digital components selected by the content platform in previous time periods when the content platform was configured with other parameter values. As another example, the parameter tuning system can select better parameter values that, once configured in the content platform, result in better metric values for various metrics (e.g., an overall digital component interaction count in a time period) using a same amount of resources as previously consumed in a previous time period when the content platform was configured using previous parameter values.

The parameter tuning platform can automatically determine other parameter values that result in improved resource utilization as compared to other parameter values not automatically determined by the parameter tuning platform. For instance, the parameter tuning platform can determine parameter values for various parameters that can limit a number of digital components that are distributed by the content platform to a given user. Limiting distribution of digital components by the content platform for various reasons can result in less use of processor resources and less utilization of network resources, for example. Example parameters for which the parameter tuning platform can automatically determine a value and which a content platform can use to limit a number of distributed digital components include: 1) a frequency cap parameter that limits a total number of digital components that can be distributed by the content platform to each user within a particular time period; and 2) a maximum number of repeats parameter that limits a number of times a same digital component can be distributed by the content platform to a same user in a particular time period.

As another example, the parameter tuning system can automatically determine values for various parameters that the content platform can use to control a number of digital components that participate in a digital component selection auction conducted by the content platform. Limiting a number of digital components that participate in the auction conducted by the content platform can save processing resources, as compared to not using parameters to limit the number of auction participants. Example parameters for which the parameter tuning platform can automatically determine a value and which a content platform can use to limit a number of digital components that participate in the content auction include: 1) different parameters that each control a maximum number of digital components of a particular format (e.g., skippable format, non-skippable format) that can participate in a content selection auction conducted by the content platform; 2) different parameters that each control a maximum number of video digital components having a particular video length range (e.g., 0-1 minutes, 1-5 minutes, 5-10 minutes, greater than 10 minutes) that can participate in a digital component selection auction conducted by the content platform (e.g., the content platform can use these parameters to allow fewer videos of longer length and more videos of shorter length to participate in the auction); 3) different parameters that each control a maximum number of digital components that can participate in an auction conducted for users in a particular country (e.g., the content platform can use these parameters to allow a fewer number of auction participants for selecting digital components for a user in a first country as compared to a larger number of auction participants for selecting digital components for a user in a second country); and 4) different parameters that each control a maximum number of video digital components having a particular creative quality (e.g., high-quality, medium-quality, low-quality, as determined by a quality analyzer of the content platform) that can participate in a digital component selection auction conducted by the content platform (e.g., the content platform can use these parameters to allow fewer videos of lower quality and more videos of higher quality to participate in the auction).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 illustrates example pseudocode for automatically determining parameter values.

DETAILED DESCRIPTION

Figure 1:
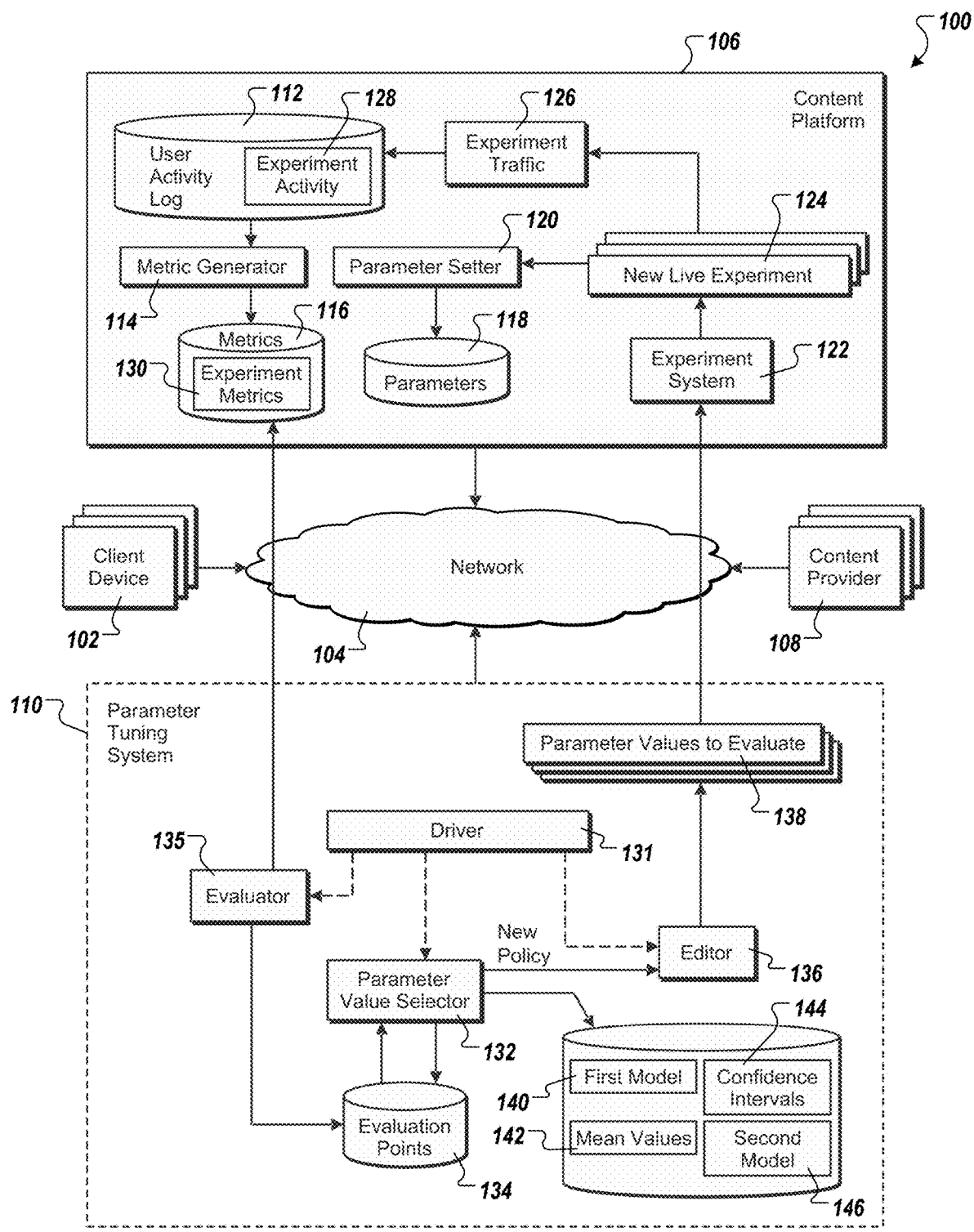
FIG. 1 is a block diagram of an example environment for automatically determining parameter values.

As summarized below and described throughout this specification, the techniques described in this specification enable automatic determination of parameter values that control or affect provision of content by a content platform. In some implementations, the techniques described in this specification provide a parameter tuning system that can determine parameter values to be provided to a content platform (e.g., for provisioning of content by the content platform) or some other type of system. Content platform parameters can control or affect provision of content by the content platform, for example. The parameter tuning system can evaluate experiment results from experiments performed on the content platform when different parameter values are configured for one or more content platform parameters. The parameter tuning system can iteratively select new parameter values to evaluate based on the experiment results. As mentioned above, the iterative selection of parameters by the parameter tuning system can result in better parameter values being selected more quickly than can be achieved using other approaches. Better parameter values are parameter values that result in generation of better metric values from data generated by the content platform when the content platform is configured using the better parameter values, as compared to worse metric values that were derived from data generated by the content platform when the content platform was configured using previous parameter values.

In further detail, the parameter tuning system can identify, during a current iteration of evaluating a content platform parameter, a set of evaluation points for the parameter corresponding to previous experiment(s). Each evaluation point includes an evaluated parameter value and a metric value. The metric value is determined from data generated when the content platform uses the evaluated parameter value to provide digital components during a previous experiment.

For instance, an example parameter may be a time spacing amount between presentation of digital components during a video viewing session. Example parameter values for this parameter may be ten seconds, thirty seconds, etc. An example metric is a video abandon rate that indicates how often users abandon the video viewing session. The parameter tuning system (or an experiment system) can run a first experiment for the time spacing amount parameter using a parameter value of thirty seconds. The content platform can track user interaction data that includes start and stop times of video viewing sessions during the first experiment. The parameter tuning system (or the content platform) can generate the video abandon rate metric from the user interaction data generated during the first experiment. For instance, an example video abandon rate metric value that may be generated from the user interaction data from the first experiment may be 10%. That is, the first experiment may indicate that ten percent of users prematurely abandon videos (i.e., prior to reaching the end of the videos) when the time spacing amount parameter is thirty seconds. Accordingly, an evaluation point for the time spacing amount parameter for the first experiment includes a parameter value of thirty seconds and a metric value of 10%. The parameter tuning system may conduct a second experiment, which results, for example, in another evaluation point for the time spacing amount parameter that includes a parameter value of ten seconds and a metric value of 15%. That is, the second experiment may indicate that fifteen percent of users prematurely abandon videos when the time spacing parameter is ten seconds.

After the parameter tuning system has identified a set of evaluation points for the parameter for previous experiments, the parameter tuning system can generate a first model using the set of evaluation points. For example, the parameter tuning system can generate a first model, such as a Gaussian model, that fits the evaluation points. The parameter tuning system can generate mean values and confidence intervals of the first model. The parameter tuning system can then generate a second model based on the first model using an acquisition function that is based on the mean values of the first model, the confidence intervals of the first model, and a configurable exploration weight that controls a priority of exploration for evaluating the parameter. Exploration is described in more detail below.

The parameter tuning system can determine at least one next parameter value to evaluate, from the second model. For example, the parameter tuning system can determine a next parameter value that results in a highest acquisition function value generated from the second model (or, in cases, the parameter tuning system can select a predetermined number of parameter values that have the highest acquisition function values). Once the parameter tuning system has selected one or more parameter values to evaluate, the parameter tuning system can configure the content platform to use the next parameter value(s) when providing digital components during a next experiment. The parameter tuning system (or an experiment system) can conduct the next experiment. The parameter tuning system can determine a next metric value based on data that results from the content platform using the next parameter value(s) to provide digital components during the next experiment.

The parameter tuning system can evaluate the next metric value, to determine whether the next metric value is an improved metric value as compared to previous metric values corresponding to previous experiments that were conducted when the content platform was configured using previously evaluated parameter values. In some cases, the parameter tuning system can determine to select the evaluated parameter value(s) that were evaluated in the next experiment for non-experiment (e.g., production) use in the content platform. For example, the parameter tuning system may determine that the next metric value is more than a predetermined threshold value (e.g., the predetermined threshold value may be a desired, or target metric value). As another example, the parameter tuning system may be configured to perform a predetermined number of experiments and the most recent experiment may have been the last experiment of the predetermined number of experiments. After the parameter tuning system has determined to select the evaluated parameter value(s) for non-experiment use, the content platform can be configured to use the evaluated parameter value(s) to control or select, during production, digital components to provide with video content provided by the content platform.

As another example, the parameter tuning system can determine to perform yet another experiment. For instance, the parameter tuning system may determine that the next metric value is not more than the predetermined threshold value or the parameter tuning system may determine that at least one more experiment is to be performed before the parameter tuning system has performed the predetermined number of experiments. In such instances, the parameter tuning system can create an updated set of evaluation points by adding additional evaluation point(s) to a set of existing evaluation points. Each added evaluation point includes a parameter value evaluated during the last experiment and a corresponding metric value that was derived from data generated by the content platform during the last experiment. The updated set of evaluation points can be used in a new experiment (e.g., to create a first model), as described above.

During each experiment iteration, the parameter tuning system can configure the exploration weight to control prioritization of exploration during the current experiment. Prioritizing exploration can result in selecting next parameter values to evaluate that have higher confidence intervals, which can correspond to parameter values ranges that have been explored less than other parameter value ranges. An approach of exploration can be compared to an approach of exploitation. An approach of exploitation can correspond to continuing to explore parameter value ranges that have high predicted metric values as compared to other parameter value ranges. Prioritizing exploitation can be achieved by reducing the exploration weight which can result in selection of next parameter values to evaluate that have higher mean values, for example. In some cases, the parameter tuning system prioritizes exploration in earlier experiments and prioritizes exploitation in later experiments. For example, because the number of evaluation points increases as the number of iterations increase, the first model may represent a more accurate fit of the current set of evaluation points in later iterations, and accordingly, more accurate predictions of metric values can be generated using the first model in later iterations, as compared to previous iterations. Because more accurate predictions of metric values are being made in later iterations, the parameter tuning system can prioritize exploitation in the later iterations. Additionally, because there is a larger range of unexplored parameter values in earlier iterations as compared to later iterations, the parameter tuning system can prioritize exploration in earlier iterations. The parameter tuning system can use other approaches to balance an exploration/exploitation tradeoff. Although an exploration weight is described, in some implementations, an exploration/exploitation tradeoff is achieved by also or additionally configuring an exploitation weight. These features and additional features and benefits are further described in greater detail below with reference to FIGS. 1-7.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally-identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 for automatically determining parameter values. The example environment 100 includes a network 104. The network 104 can include a local area network (LAN), a wide area network (WAN), the Internet, or a combination thereof. The network 104 can also include any type of wired and/or wireless network, satellite networks, cable networks, Wi-Fi networks, mobile communications networks (e.g., 3G, 4G, and so forth), or any combination thereof. The network 104 can utilize communications protocols, including packet-based and/or datagram-based protocols such as internet protocol (IP), transmission control protocol (TCP), user datagram protocol (UDP), or other types of protocols. The network 104 can further include a number of devices that facilitate network communications and/or form a hardware basis for the networks, such as switches, routers, gateways, access points, firewalls, base stations, repeaters or a combination thereof.

The network 104 connects client devices 102, content platforms 106, content providers 108, and a parameter tuning system 110. The example environment 100 can include many different content platforms 106, client devices 102, and content providers 108.

A content platform 106 is a computing platform (such as, e.g., a network server or another data processing apparatus described with reference to FIG. 7) that enables distribution of content. Example content platforms 106 include search engines, social media platforms, video sharing platforms, new platforms, data aggregator platforms, or other content sharing platforms. Each content platform 106 may be operated by a content platform service provider. Each of the components of the content platform 106 are software components that include instructions that are executed by a processing entity such as a processor The content platform 106 can publish and make available its own content. For example, the content platform 106 may be a news platform, which publishes its own news articles. The content platform 106 may also display content (e.g., digital components) provided by one or more content providers 108 that are not part of the content platform 106. In the above example, the news platform may also display third party content provided by one or more content providers 108. As another example, the content platform 106 may be a data aggregator platform that does not publish its own content, but aggregates and displays third party content provided by different content providers 108.

In some implementations, a content platform 106 may store certain information about a client device (e.g., device preference information, content consumption information, etc.). Such user information may be used by the content platform, e.g., to tailor the content that is provided to the client device 102 or to enable ready access to particular content that is frequently accessed by the client device 102. In some implementations, the content platform 106 may not store such device information on the platform; however, the content platform 106 may nevertheless provide such information for storage on a particular server (separate from the content platform). The content platform 106 (also referred to herein as content platform/server 106 or simply server) thus refers to a content platform that stores such device information or a server (separate from the content platform) that stores such device information.

In some implementations, the content platform 106 is a video service through which users can view streamed video content. Videos that are streamed to a user can include one or more digital components (e.g., provided by a content provider 108) that are overlaid on top of the original video stream. For example, it can be generally desirable to provide overlaid content on an underlying video stream, to provide digital component(s) to a viewer of the video stream and to improve the quantity of content delivered within the viewing area for a given video streaming bandwidth. In addition or alternatively to video streaming scenarios, the content platform 106 can include a video processor that processes a video file, to modify the video file to include overlaid content, with the processed video file with the overlaid content being provided to the client device 102 for display on the client device 102. As another example as an alternative to overlaid content, the content platform 106 can provide digital components that are presented to the user at scheduled break points in the video stream (rather than being overlaid on top of the video stream).

The content platform 106 can maintain a user activity log 112 that includes anonymized information corresponding to user activities with content provided by the content platform 106 and content (e.g., digital components) provided by the content providers 108. For example, for video content, the user activity log 112 can include information regarding start and stop times of video viewing sessions, presentation of digital components with the video content, user interactions with presented digital components, and other user activity information.

A metric generator 114 of the content platform 106 can generate various types of metrics from data in the user activity log 112. Metrics generated by the metric generator 114 can be stored in a metrics database 116. Example metrics can include metrics related to latency or responsiveness, as described in more detail below. Other example metrics generated by the metric generator 114 can include click through rate which indicates a rate of interaction with a digital component, a view through rate which indicates a percentage of users who view a particular video digital component to completion, abandon rate which indicates a percentage of users who abandon a video content item, revenue metrics that indicate revenue obtained from presenting digital components, return on investment metrics, content and digital component presentation counts, and other types of metrics.

Some metrics generated by the metric generator 114 can correspond to a particular goal of a user or entity that uses the content platform 106 and/or satisfaction of a user or entity with the content platform 106. For example, the content platform 106 and content providers 108 may receive revenue from presentation of digital components with content provided by the content platform 106. Accordingly, metrics such as revenue metrics, count of presented digital components, etc., may be of interest to and may correspond to goals of the content platform 106 or content providers 108. Content providers 108 who provide digital components may have other goals, such as return on investment, and may therefore have interest in other metrics such as interaction rates with presented digital components.

As another example, some metrics generated by the metric generator 114 may correspond to user satisfaction with the content platform 106 by users of the client devices 102 who consume content provided by the content platform 106. For example, some metrics may correspond with user perception of content provided by the content platform 106 (and/or user perception with the content platform 106 itself). For example, for video content, a video leave rate metric for a video that has been presented along with digital components may correlate to user perception with the presented digital components, the number and spacing of presented digital components, etc. Accordingly, a tradeoff can occur between different goals for different entities. For instance, a video creator may desire to receive more revenue by having more digital components scheduled for presentation with their video, but presenting more digital components may reduce user satisfaction with the video and may cause users to prematurely abandon the video (thus preempting playback of some of the scheduled digital components). Additionally, presenting more digital components may not necessarily increase long-term return on investment for providers of the digital components, as presenting more digital components may decrease an interaction rate for respective digital components, either due to a user being overwhelmed or annoyed with too many digital components or a general decrease in relevance of the digital components to presented resource content. Other metrics that may correspond to user satisfaction or user goals may include overall system latency or responsiveness. For example, a user's satisfaction with the content platform 106 generally declines as latency for playback of content or digital components increases.

In some implementations, the metric generator 114 can generate a combined metric that combines multiple, different metrics. For example, a combined metric may be a combination of different metrics that each represent a goal of a different entity that uses the content platform 106. For example, a combined metric may be based on a combination of sub-metrics that include a user acceptance metric (e.g., video abandon rate), a revenue-related metric (e.g., count of digital components presented with a video), and a digital component interaction rate metric. The metric generator 114 can, in some cases, generate the combined metric by adjusting (e.g., multiplying) each sub-metric value by a corresponding sub-metric weight (e.g., a value ranging between 0 and 1) and aggregating (e.g., adding) the adjusted sub-metric values.

The provision of content by the content platform 106 can be controlled by various parameters 118. The parameters 118 can be configured by a parameter setter 120, which can be an automated process and/or can include a user interface component for receiving parameter values from an administrator. The parameters 118 can include, for example, one or more parameters that can be used by the content platform 106 to control a time spacing between presentation of multiple digital components that are presented with a video. Other parameters can be used by the content platform 106 to control a frequency or likelihood of selecting different types of digital components (e.g., digital components having a certain type of content) for certain types of videos. In general, the content platform 106 can include hundreds of various types of parameters.

The parameter setter 120 can set a given parameter to a particular parameter value, which can affect provision of content by the content platform 106, as described above. Provision of content by the content platform 106 according to different parameter values can affect user activity and can therefore, in turn, affect the goal-related metrics described above that are generated by the metric generator 114. For example, if a time spacing parameter is reduced by the parameter setter 120 from thirty seconds to ten seconds (e.g., so that a new digital component is displayed every ten seconds while a user is watching a video), short-term revenue may increase for the video creator due to an increased number of presentations of digital components, but users may become annoyed, e.g., from repeated interruptions to playing video content by the presentation of digital components, and may consequently spend less time viewing content on the content platform 106, thereby reducing long-term revenue for the content platform 106 and content providers 108.

Another example parameter for the content platform 106 is a user cost penalty parameter whose value represents a magnitude of long-term revenue cost reduction that might occur if a digital component is selected by the content platform 106 for playback at a certain time point in a video, for example. The user cost penalty parameter value can be used by the content platform 106 in an auction that is used to select digital components for playback with the video. The user cost penalty parameter value can be used by the content platform 106 to balance out other factors, such as predicted interaction with the digital component, predicted short-term revenue, etc. Administrators of the content platform may not initially know a value to assign to the user cost penalty parameter. As described in more detail below, the parameter tuning system 110 can be used to automatically determine a value to use for the user cost penalty parameter (and other parameters).

The parameter setter 120 changing a parameter value may eventually have an effect on various metrics, but administrators of the content platform 106 may not know a parameter value to specify for certain parameters to achieve respective metric value(s) (relative to other determined metric values for the parameters or relative to predetermined thresholds). An unknown landscape may exist for the parameter with respect to a given metric, for example. The landscape for a parameter with respect to a metric may be complex, and may correspond to an unknown function that has a high degree of freedom and nonlinearity, such that directly calculating a predicted metric value for any given parameter value, without knowing the function, may be impossible. Accordingly, there may be no direct way for the parameter setter 120 to calculate a parameter value that achieves a metric value that is better relative to other determined metric values for the parameters or relative to a predetermined threshold.

The content platform 106 can learn an effect on metrics in response to the parameter setter 120 changing parameter values by using an experiment system 122. The experiment system 122 can configure various experiments 124. The experiments 124 can include information that specifies one or more values to evaluate during the experiment for one or more evaluated parameters. For example, a current value for a time-spacing parameter that controls spacing between digital components may be thirty seconds. An experiment 124 can specify that a different parameter value, such as ten seconds, is to be evaluated during the experiment. The content platform 106 can use the experiment system 122 to split live traffic between production (e.g., non-experiment) and experiment traffic 126. For example, the content platform 106 can use the experiment system 122 so that a first portion (e.g., 99%) of content requests are handled by the content platform 106 according to current (e.g., production) parameter values and a second portion (e.g., 1%) of content requests are handled as the experiment traffic 126 by the content platform 106 according to information specified in the experiment 124. The parameter setter 120 can set parameter values according to experiment 124 information, for the second portion of content requests, during the experiment 124, for example.

The changing of parameter values during an experiment by the parameter setter 120 can affect the provision of content (e.g., the video as a whole or digital components provided with/during the video) by the content platform 106. For example, certain types of digital components may be selected more or less often by the content platform 106, or a different number of digital components may be selected by the content platform 106. Users of the client devices 102 may react to the affected provision of content by the content platform 106. For example, users may interact with (e.g., by clicking/selecting or spending time viewing) digital components more, or less, or in different ways. As another example, users may interact differently, for instance, with video content with which digital components are presented. For example, users who receive content according to the experiment may tend to abandon video content at a lower or greater frequency, or may abandon video content closer to or farther from the end of the video. The content platform 106 can track and store these and other types of user interactions during experiments as experiment activity 128.

The metric generator 114 can generate experiment metrics 130, from the experiment activity 128. The experiment metrics 130 can include information indicating which parameter values were used for the experiment 124. The experiment system 122 can compare the experiment metrics 130 that were generated by the metric generator 114 from the experiment activity 128 to corresponding non-experiment metrics in the metrics database 116 that were generated by the metric generator 114 from user activity from non-experiment traffic, to determine whether at least some of the experiment metrics 130 are better than the corresponding non-experiment metrics. If an experiment metric 130 is better than the corresponding non-experiment metric, the parameter setter 120 can determine parameter value(s) that were used during the experiment and set corresponding parameters to those parameter values, for subsequent (e.g., non-experiment) content provision by the content platform 106.

As mentioned above, the running of experiments by the experiment system 122 can be expensive in terms of resources. Resources (e.g., processing time, data storage, administrator time, network bandwidth, real-time content requests for experiments) available to the content platform 106 for experiments may be limited. Accordingly, brute force methods of trying all possible parameter values, for every parameter, are not feasible. Other approaches, such as randomly selecting parameter values, are generally not effective, since parameter values that are poor choices for achieving desired metric values may continue to be selected for evaluation.

As an alternative to brute force, random, or other approaches for selecting parameter values, the parameter tuning system 110 can automatically determine parameter values by performing a parameter tuning process for the parameter. Each of the components of the parameter tuning system 110 are software components that include instructions that are executed by a processing entity such as a processor. Although the parameter tuning system 110 is described as tuning parameters for the content platform 106, the parameter tuning system 110 can tune parameters for other types of systems. Although shown as separate from the content platform 106, in some implementations, some or all of the components of the parameter tuning system 110 may be included in the content platform 106.

A driver 131 of the parameter tuning system 110 can be used to control parameter tuning processes. For example, an administrator can use the driver 131 to start a parameter tuning process or stop a parameter tuning process. As another example, the driver 131 can be used to perform automatic parameter tuning for a parameter. For example, the driver 131 can automatically and/or periodically (e.g., every week, every month), perform a parameter tuning process for a parameter.

In response to a request or determination to start a parameter tuning process, the driver 131 can invoke a parameter value selector 132. The parameter value selector 132 can perform multiple parameter tuning iterations when tuning a parameter. The parameter value selector 132 can, during each parameter tuning iteration, automatically select, based on data from past experiments, one or more next parameter values to evaluate in a next experiment. As described in more detail below, the parameter value selector 132 can be configured to perform a predefined number of parameter tuning iterations during a parameter tuning process or the parameter value selector 132 can stop the parameter tuning process in response to determining that an experiment metric value generated from experiment data for an evaluated parameter value satisfies (e.g., meets or exceeds) a threshold metric value.

In further detail, the parameter value selector 132 can use, as input, evaluation points 134 corresponding to past experiments. As described in more detail below, an initial set of evaluation points 134 can correspond to experiments conducted by the experiment system 122 using random parameter values. Other evaluation points 134 used by the parameter value selector 132 can correspond to experiments previously conducted by the experiment system 122 using parameter values previously selected by the parameter value selector 132 in earlier iterations of the parameter tuning process. Each evaluation point 134 includes an experiment metric value from a previous experiment and a parameter value that was used by the content platform 106 to provide content during the previous experiment. An evaluator 135 can receive or access experiment data generated by the metric generator 114 (e.g., the experiment metrics 130) from the content platform 106 to generate the evaluation points 134, for example. Evaluation points are illustrated and described in more detail below with respect to FIG. 2A.

To generate the initial evaluation points, the parameter value selector 132 can randomly generate a predefined number of random parameter values for the parameter. For each random parameter value, the driver 131 can use an experiment file editor 136 to create an experiment file 138 that includes a random parameter value to evaluate. The parameter tuning system 110 can provide the experiment file 138 to the experiment system 122. The experiment system 122 can conduct a random parameter value experiment using the experiment file 138, during which content is provided by the content platform 106 according to the random parameter value (e.g., as experiment traffic 126). As described above, during the random parameter value experiment, the parameter setter 120 can set the parameter to the random parameter value and the content platform 106 can track experiment activity 128 that occurs in response to the experiment traffic 126. The metric generator 114 can generate experiment metrics 130 based on the experiment activity 128 and the experiment metrics 130 can be provided by the content platform 106 to the evaluator 135. The evaluator 135 can populate the initial evaluation points 134 for the parameter using the random parameter values and the received metrics generated from the random parameter value experiments.

During a parameter tuning iteration, the parameter value selector 132 obtains a current set of evaluation points 134 (e.g., the initial evaluation points for a first iteration or evaluation points for a subsequent iteration after the first iteration). The parameter value selector 132 generates a first model 140 using the obtained evaluation points 134. The first model 140 can be a probabilistic model of the evaluation points 134 that fits the evaluation points 134. The first model 140 can be a Gaussian model, for example, that can generate a prediction for a metric value for unevaluated parameter values. The parameter value selector 132 can determine mean values 142 and confidence intervals 144 from the first model 140. Confidence intervals can correspond to standard deviation values, for example. The first model 140, mean values 142, and confidence intervals 144 are described in more detail below with respect to FIG. 3A and FIG. 4.

After the parameter value selector 132 generates the first model 140, the parameter value selector 132 can generate a second model 146 using the mean values 142 and the confidence intervals 144 derived from the first model 140. For example, the second model 146 can be based on an acquisition function that is based on a combination of the mean values 142, the confidence intervals 144, and an exploration weight that gives weight to the confidence intervals 144. While the first model 140 represents predicted metric values for parameter values that are based on the fitting of the existing evaluation points, the second model 146 can represent potential of unexplored parameter values.

The parameter value selector 132 can assign a larger exploration weight in earlier parameter tuning iterations and a smaller exploration weight in later parameter tuning iterations. The parameter value selector 132 can determine one or more next parameters to evaluate based on the second model 146. The parameter value selector 132 can select parameter value(s) for which the acquisition function produces highest acquisition function values, for example. The second model 146, the acquisition function, and exploration versus exploitation are described in more detail below with respect to FIG. 3B and FIG. 4.

For each parameter value selected by the parameter value selector 132, the driver 131 can use the experiment file editor 136 to create an experiment file 138 that includes the selected parameter value. The parameter tuning system 110 can provide the experiment file 138 to the experiment system 122 and the experiment system 122 can conduct an experiment during which content is provided by the content platform 106 according to the selected parameter value (e.g., as experiment traffic 126). As described above, the parameter setter 120 can set the parameter to the selected parameter value and the content platform 106 can track experiment activity 128 that occurs in response to the experiment traffic 126. The metric generator 114 can generate experiment metrics 130 based on the experiment activity 128 and the experiment metrics 130 can be provided to the evaluator 135. The experiment metrics 130 can include the goal-related metrics described above. As discussed above, a goal-related metric can be a combined metric that represents a combination of different goals of different entities that use the content platform 106.

In some implementations, the evaluator 135 determines whether a received experiment metric for a selected parameter value meets a threshold metric value. For example, the parameter tuning process can be configured to stop when a metric value generated by the metric generator 114 from an experiment conducted using a selected parameter value satisfies (e.g., meets or exceeds) a threshold metric value (e.g., a predetermined, satisfactory or desired metric value). If the received experiment metric for the selected parameter value meet the threshold metric value, the parameter tuning system 110 can determine that the parameter tuning process has finished for the parameter. On the other hand, if the selected parameter value does not satisfy (e.g., is less than) the threshold metric value, the parameter tuning process can continue to be iterated through additional parameter tuning iterations. As another example, the parameter tuning system 110 can also determine that the parameter tuning process has finished for the parameter if a predetermined number of parameter tuning iterations have been performed for the parameter.

In response to determining that the parameter tuning process has finished for the parameter, the parameter tuning system 110 can instruct the content platform 106 to use an evaluated parameter value previously evaluated by the parameter value selector 132, for non-experiment traffic. The parameter value selector 132 can select a previously-evaluated parameter value that resulted in a best evaluated metric value, for example. For example, the parameter setter 120 can set the parameter to the selected previously-evaluated parameter value and the content platform 106 can provide content in response to subsequent requests for content in accordance with the parameter value. For example, the content platform 106 can use the selected previously-evaluated parameter value to control or select, during production, digital components to provide with video content.

If the parameter tuning system 110 determines that a stopping point has not been reached for the parameter tuning process for the parameter, the evaluator 135 can generate new evaluation point(s) 134 for the parameter, using the parameter value(s) selected by the parameter value selector 132 in the previous iteration and corresponding metric values generated by the metric generator 114 from experiment(s) conducted using the parameter value(s) selected by the parameter value selector 132 in the previous iteration, to generate updated evaluation points 134 (e.g., the new evaluation points can be added to an existing set of evaluation points 134). The parameter value selector 132 can perform a next parameter tuning iteration for the parameter, using the updated evaluation points 134 for the parameter.

The parameter tuning system 110 can perform different parameter tuning processes for different parameters. Each parameter tuning process for a parameter performed by the parameter tuning system 110 can involve tuning the parameter with respect to a given metric. The parameter tuning system 110 can perform different parameter tuning processes for different metrics. The parameter tuning system 110 can perform different parameter tuning processes in parallel or sequentially. Additional structural and operational aspects of these components of the parameter tuning system 110 and the parameter tuning process are described below with reference to FIGS. 2A to 6.

Figure 2A:
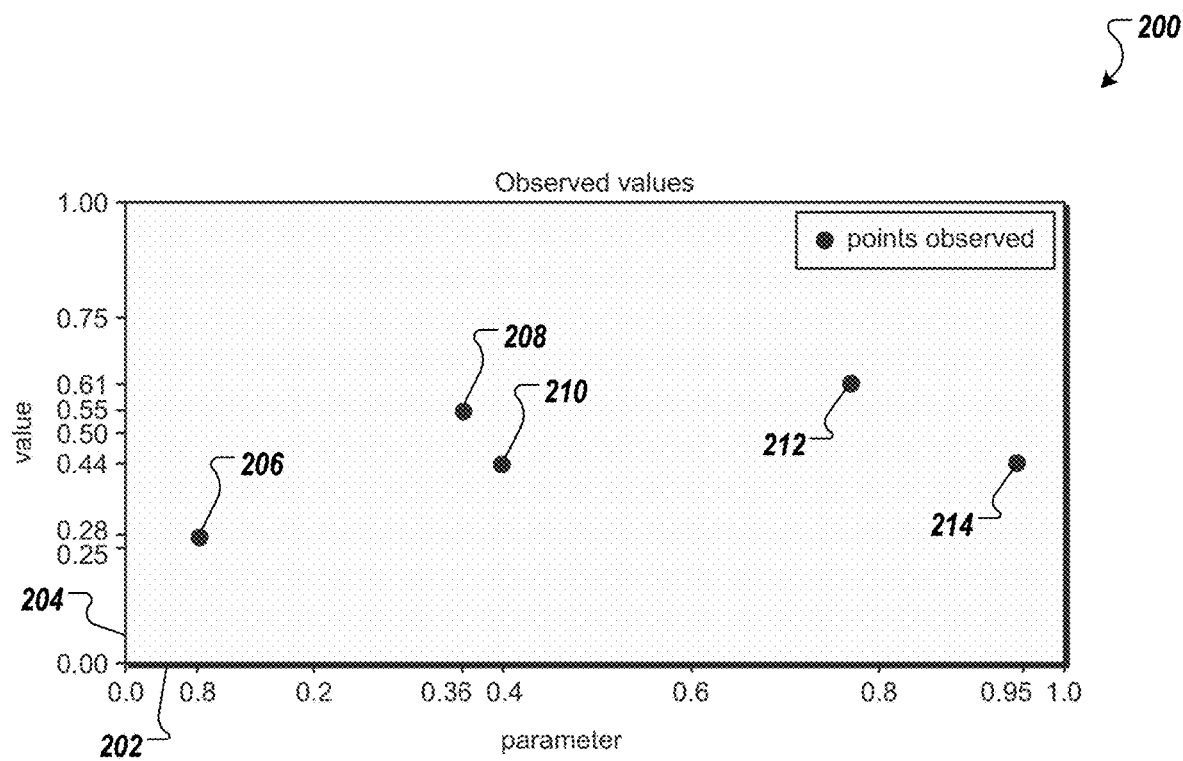
FIG. 2A is an example graph on which evaluation points for a parameter are plotted.

FIG. 2A is an example graph 200 on which evaluation points for a parameter are plotted. An X-axis 202 corresponds to values of the parameter. The parameter may be a setting that can take on a real number value between zero and one, for example. A Y-axis 204 corresponds to values of a metric generated by the metric generator 114 when the content platform 106 provided content based on particular parameter values for the parameter during an experiment, for example. Evaluation points 206, 208, 210, 212, and 214 are observed points that each include an evaluated parameter value and a corresponding metric value. For example, as illustrated by the evaluation points 206, 208, 210, 212, and 214, when the parameter had a value of 0.8, 0.36, 0.4, 0.78, and 0.95, corresponding metric values generated by the metrics generator 114 were 0.28, 0.55, 0.44, 0.61, and 0.44, respectively. The evaluation points 206, 208, 210, 212, and 214 can be included in the evaluation points 134 described above with respect to FIG. 1, for example.

The evaluation point 212 with a parameter value of 0.78 and a metric value of 0.61 corresponds to a highest metric value among the evaluation points 206, 208, 210, 212, and 214. While the parameter value of 0.78 of the evaluation point 212 may be a best parameter value for the parameter among the observed points, other as-yet unevaluated parameter values may result in better corresponding metric values being generated by the metric generator 114 if configured for the parameter by the parameter setter 120. However, as described above, a landscape of parameter values, or a "true function" for the parameter may not be known by the parameter tuning system 110 after observing only the current observed points. The true function for the parameter can be a function that reflects the actual metric values for various possible parameter values. The true function (if known) can output a metric value given a particular parameter value of the parameter. Since the parameter tuning system 110 does not know the true function, the parameter tuning system 110 can perform the parameter tuning process for the parameter.

Figure 2B:
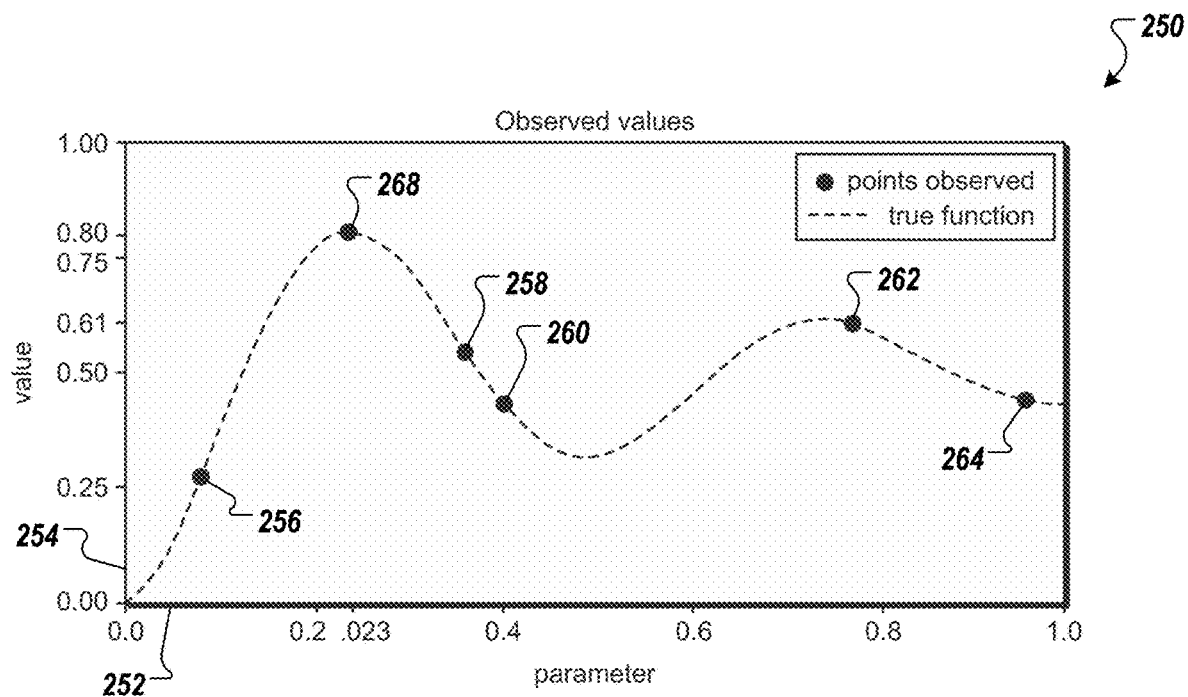
FIG. 2B is an example graph that illustrates a true function for a parameter.

FIG. 2B is an example graph 250 that illustrates a true function for a parameter. An X-axis 252, a Y-axis 254, and evaluation points 256, 258, 260, 262, and 264 correspond to the X-axis 202, the Y-axis 204, and the evaluation points 206, 208, 210, 212, and 214 of FIG. 2A, respectively. A true function line 266 illustrates a true function, or a landscape of metric values given different parameter values. As mentioned, the parameter tuning system 110 doesn't know the true function. Rather, the parameter tuning system 110 currently knows the evaluation points 256, 258, 260, 262, and 264 (which correspond to evaluation points 206, 208, 210, 212, and 214 of FIG. 2A). As mentioned above, the evaluation point 262 (which corresponds to the evaluation point 212 of FIG. 2A) has a highest observed metric value (e.g., 0.61), but as shown by a point 268 on the true function line 266, an unevaluated parameter value of 0.23, if configured by the parameter setter 120, would result in a higher metric value (e.g., 0.80) being generated by the metric generator 114. The parameter value selector 132 is configured to perform the parameter tuning process to find better parameter values than those of observed evaluation points, such as the parameter value of 0.23 of the point 268.

Figure 3A:
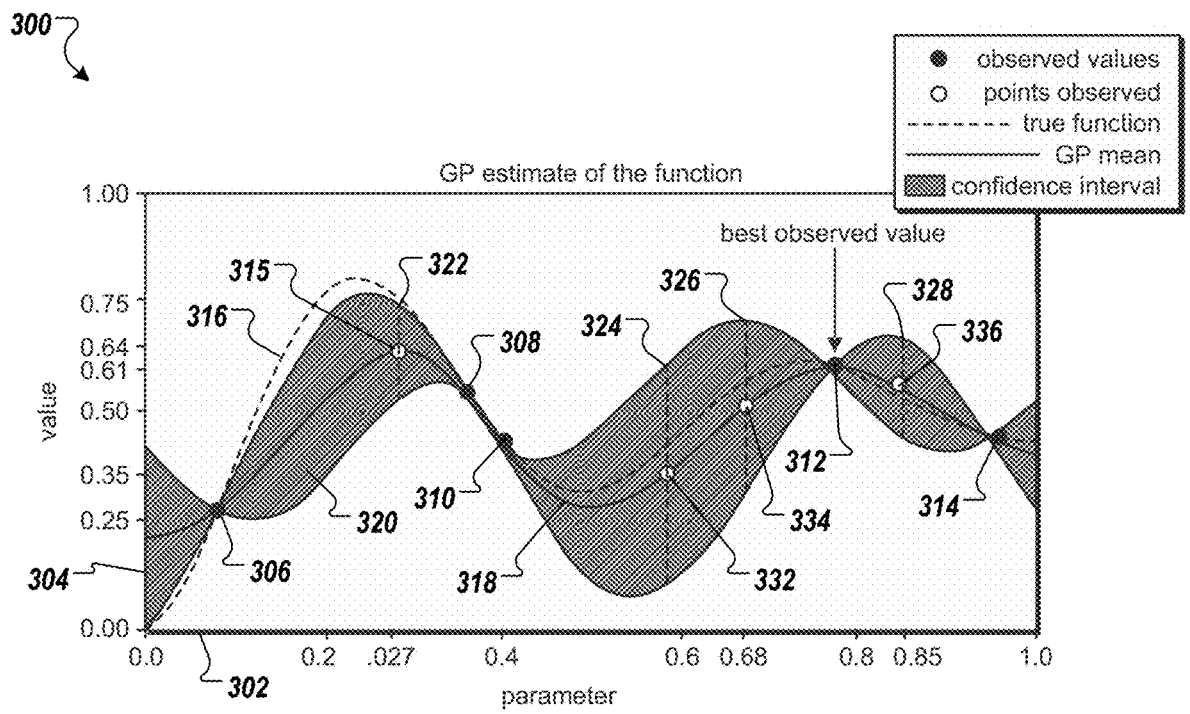
FIG. 3A is a graph that illustrates mean values and confidence intervals.

FIG. 3A is a graph 300 that illustrates mean values and confidence intervals. An X-axis 302, a Y-axis 304, and evaluation points 306, 308, 310, 312, and 314 correspond to the X-axis 202, the Y-axis 204, and the evaluation points 206, 208, 210, 212, and 214 of FIG. 2A, respectively. A true function line 316 corresponds to the true function line 266 of FIG. 2B.

As described above with respect to FIG. 1, the parameter value selector 132 can generate a first model using the evaluation points 306, 308, 310, 312, and 314. The first model (which can be the first model 140) can be a Gaussian model that fits the evaluation points 306, 308, 310, 312, and 314, for example. The first model is shown on the graph 300 as a Gaussian line 318. The Gaussian model can include observed points (e.g., the evaluation points 306, 308, 310, 312, and 314) and predictions for points (e.g., the mean values 142) that are between the observed points. For example, a predicted point 315 includes a parameter value of 0.27 a predicted metric value of 0.64.

In some implementations, the first model is an aggregate model that combines multiple, other models, where each of the multiple, other models uses a different approach to fit the evaluation points 306, 308, 310, 312, and 314. When the first model is an aggregate model, the first model can include mean average values that are determined as average predicted metric values of the multiple, other models.

Shaded regions on the graph 300, such as a shaded region 320, represent confidence intervals (e.g., the confidence intervals 144) that the parameter value selector 132 calculates from the first model. As shown in the graph 300, confidence intervals at and in proximity to the evaluation points 306, 308, 310, 312, and 314 are low, due to the evaluation points 306, 308, 310, 312, and 314 being known, or observed points, rather than corresponding to predicted metric values. For other portions of the Gaussian line 318, larger confidence intervals exist, such as in ranges of parameter values that have less observed points, and are therefore less explored than other parameter value ranges. For example, vertical lines 322, 324, 326, and 328 illustrate confidence intervals that are larger than in other areas of the graph 300.

As described above, the parameter value selector 132 can select next parameter value(s) to evaluate based on a second model (e.g., the second model 146) that uses a combination of mean values of the first model and confidence intervals of the first model. The parameter value selector 132 can generate and use an acquisition function, for example, to generate the second model, as illustrated below with respect to FIG. 3B. As described in more detail below with respect to FIG. 4, the acquisition function can have a general form as shown below in Equation (1).

$$f(x) = \text{Exploration\_Weight} * \text{Confidence\_Interval}(x) + \text{Mean}(x) \quad (1)$$

The exploration weight, which can be set by an administrator and/or by the parameter value selector 132, can control a priority or bias that is used in the acquisition function to the confidence interval value with respect to the mean value. A higher exploration weight can result in higher priority given by the parameter value selector 132 for exploration (e.g., exploration within parameter value ranges, which have not yet been explored). A lower exploration weight can reduce a priority of exploration for the parameter value selector 132, which can increase a priority of exploitation for the parameter value selector 132. Exploitation can refer to the parameter value selector 132 selecting parameter values that the first model predicts will result in highest metric values. As described above, the parameter value selector 132 can initially prioritize exploration (e.g., by configuring a higher exploration weight), when a count of evaluated parameter values is lower, and later prioritize exploitation (e.g., by configuring a lower exploration weight) as the count of evaluated parameter values increase. In summary, the parameter value selector 132 can first prioritize exploring unexplored parameter value ranges and later explore parameter values that are predicted to have highest metric values, such as parameter values that are near evaluated parameter values that have resulted thus far in highest metric values.

Given that the acquisition function uses a combination of confidence interval values and mean values, the highest acquisition function values that are generated by the parameter value selector 132 using the activation function may be parameter values which have relatively larger confidence intervals, relatively larger mean values, or have relatively larger combinations of confidence interval and mean values, with respect to other parameter values. For example, the predicted point 315 with a parameter value of 0.27 has a largest predicted metric value of 0.64 among parameter values and a confidence interval (e.g., represented by the height of the vertical line 322) that is larger than other parameter values. Accordingly, the parameter value selector 132 may select the parameter value 0.27 of the predicted point 322 as a next parameter to evaluate, as described in more detail below with respect to FIG. 3B.

In some cases, the parameter value selector 132 selects one next parameter to evaluate for each next experiment. In other cases, the parameter value selector 132 may select more than one next parameter value to evaluate for the next experiment. As such, the parameter value selector 132 may select other parameter values other than the parameter value 0.27 of the predicted point 315. For example, a predicted point 332 with a parameter value of 0.58 has a predicted metric value of 0.35, which is lower than the predicted metric value 0.64 for the predicted point 315. However, the confidence interval for the parameter value 0.58 of the predicted point 332 (e.g., represented by the height of the vertical line 324) is larger than the confidence interval for the predicted point 315. Depending on the value of the exploration weight, the parameter value 0.58 of the predicted point may be selected as a next parameter to evaluate. The relatively high confidence interval for the parameter value 0.58 of the predicted point 332 can represent high potential (e.g., high potential of the parameter value selector 132 finding a best or better parameter value as compared to the existing evaluated parameter values). The relatively high potential of the parameter value 0.58 may result in the parameter value 0.58 being selected by the parameter value selector 132 as a next parameter to evaluate, even though the predicted metric value for the parameter value 0.58 is lower than other predicted points. As other examples, parameter values of 0.68 and 0.85 of predicted points 334 and 336, respectively, may be selected by the parameter value selector 132 as next parameter values to evaluate, if a combination of weighted confidence intervals and the mean values of those predicted points result in highest (or within a predetermined number of highest) acquisition function values.

Figure 3B:
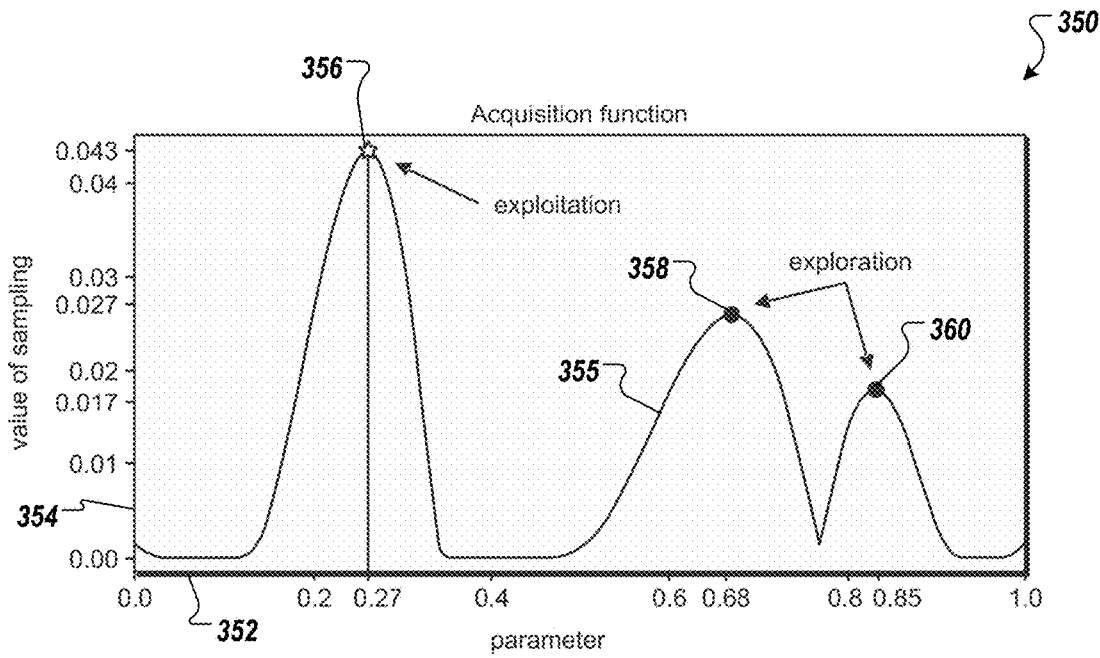
FIG. 3B is a graph that illustrates an acquisition function.

FIG. 3B is a graph 350 that illustrates an acquisition function. An X-axis 352 corresponds to parameter values. A Y-axis 354 corresponds to the value of the acquisition function given particular parameter values. An acquisition function line 355 is plotted on the graph 350. The acquisition function is a function that can output values that are used by the parameter value selector to select next parameter values to evaluation (e.g., the acquisition function can produce values that guide the parameter value selector 132 how to explore the parameter value space during the parameter tuning process. For example, the parameter value selector 132 can select a next parameter to evaluate by determining a parameter value that has a highest acquisition function value. For example, the parameter value selector 132 can determine that a point 356 on the acquisition function line 355, with a parameter value of 0.27 has a highest acquisition function value of 0.043. The point 356 is at a highest peak of the acquisition function line 355, for example. The point 356 corresponds to the predicted point 315 described above with respect to FIG. 3A. Although the parameter value of 0.27 of the point 356 can be selected by the parameter value selector 132 based on a combination of a confidence value (e.g., exploration) and a mean value (e.g., exploitation), the parameter value of 0.27 may be selected by the parameter value selector 132 primarily based on the mean value. As such, the parameter value of 0.27 may be considered to be primarily an "exploitation" parameter value.

The parameter value selector 132 can select other parameter values to evaluate based on the acquisition function. For example, the parameter value selector 132 can select parameter values of 0.68 and 0.85 of points 358 and 360, respectively. The points 358 and 360 are each at other peaks of the acquisition function line 355. The points 358 and 360 correspond to the predicted points 334 and 336 of FIG. 3A, respectively. While the parameter value selector 132 can select the parameter values 0.68 and 0.85 based on a combination of a confidence value (e.g., exploration) and a mean value (e.g., exploitation), the parameter values of 0.68 and 0.85 may be selected by the parameter value selector 132 primarily based on confidence values. Accordingly, the parameter values of 0.68 and 0.85 may be considered to be primarily "exploration" parameter values. The mean values of the parameter values 0.68 and 0.85 can be affected by the mean value of the nearby known evaluation point 312 (e.g., where "nearby" means within a threshold distance of the known evaluation point 312). The parameter value selector 132 selecting the parameter values 0.68 and 0.85 can be considered to be further exploring areas around the known evaluation point 312.

FIG. 4 illustrates example pseudocode 400 for automatically determining parameter values. In some implementations, the code corresponding to the pseudocode 400 can be executed by any appropriate data processing apparatus, including the parameter value selector 132 and the experiment system 122 described above with respect to FIG. 1, for example.

In line 1, the parameter value selector 132 sets a variable m to a number of trials per round. A number of trials per round can represent how many parameter values are evaluated each round.

In line 2, the parameter value selector 132 sets a variable k to a number of experiment rounds.

In line 3, the parameter value selector 132 sets a gamma variable to an exploration bias value. The gamma variable corresponds to the exploration weight described above with respect to FIG. 3B.

In line 4, the parameter value selector 132 sets initializes a data_points array to be an empty array.

In line 5, the parameter value selector 132 sets a new_trials array to be an empty array.

In line 6, the parameter value selector 132 configures a first iteration construct to repeat a total of m times (e.g., one iteration for each trial).

In line 7, during a given iteration of the first iteration construct, the parameter value selector 132 generates a random parameter value x[i].

In line 8, the parameter value selector 132 adds the random parameter value to the new_trials array.

In line 9, the experiment system 122 performs experiments using the random parameter values in the new_trials array, to generate metric values $y_1, y_2, \ldots, y_m$.

In line 10, the parameter value selector 132 creates evaluation points $(x_1, y_1), (x_2, y_2), (x_m, y_m)$ and adds the evaluation points to the data_points array.

In line 11, the parameter value selector 132 configures a second iteration construct to repeat a total of k−1 times. For instance, as described above with respect to FIG. 1, the parameter value selector 132 can be configured to perform a predefined number of parameter tuning iterations during a parameter tuning process. The value k in line 11 corresponds to the predefined number of parameter tuning iterations.

In line 12, the parameter value selector 132 creates a first model (e.g., the first model 140) that fits the evaluation points in the data_points array.

In line 13, the parameter value selector 132 resets a new_trials array to be an empty array.

In line 14, the parameter value selector 132 sets a new_trials array to be an empty array that clones the evaluation points in the data_points array and stores the cloned evaluation points in a temporary array.

In line 15, the parameter value selector 132 clones the first model and stores the cloned first model in a temporary object.

In line 16, the parameter value selector 132 configures a third iteration construct to repeat a total of m times (e.g., one iteration for each trial).

In line 17, based on the first model (e.g., the fitted Gaussian model created in line 12), the parameter value selector 132 determines function values using an upper confidence bound (ucb) function which corresponds to the acquisition function illustrated in FIG. 3B. The parameter value selector 132 calculates a ucb function value using the mean of the Gaussian model, the standard deviation (e.g., confidence) of the Gaussian model, and a gamma parameter. The gamma parameter is a parameter that the parameter value selector 132 can configure to control a prioritization level for exploration (vs exploitation), as described above with respect to FIG. 3B and as described below with respect to line 24.

In line 18, the parameter value selector 132 determines a parameter value x[i] that has a maximum ucb function value (e.g., a maximum acquisition function value). For instance, as shown in FIG. 3B, the point 356 corresponds to a maximum acquisition function value.

In line 19, the parameter value selector 132 adds the parameter value x[i] that has the maximum acquisition function value to the new_trials array (e.g., which corresponds to including the maximum acquisition function value in a new experiment set for a next parameter tuning iteration).

In line 20, the parameter value selector 132 adds a new point to a temporary model, where the new point includes an X value x[i] of the parameter value with the highest acquisition function value and a Y value of the highest acquisition function value.

In line 21, the parameter value selector 132 creates an adjusted first model by performing a fit operation to fit the points in the temporary model (e.g., where the temporary model includes the new point with the highest acquisition function value). Including the new point in the fit operation can result in confidence values for x[i] becoming zero in later iterations of the third iteration construct (e.g., at line 17), which can cause the parameter value selector 132 to select, for evaluation, other parameter values that have higher (e.g., non-zero) confidence values. That is, higher confidence values can result in higher acquisition function values, according to the ucb function of line 17. As an example, the parameter value selector 132 can select points 358 and 360, based in part on non-zero confidence values of the points 358 and 360.

In line 22, the experiment system 122 performs experiments using the parameter values in the new_trials array, to generate metric values $y_1, y_2, \ldots, y_m$.

In line 23, the parameter value selector 132 creates evaluation points $(x_1, y_1), (x_2, y_2), \ldots (x_m, y_m)$ and adds the evaluation points to the data_points array.

In line 24, the parameter value selector 132 optionally adjust the gamma variable to correspond to a different exploration weight. As described above with respect to FIG. 3B, the exploration weight can be higher in earlier iterations and lower in later explorations (so that exploration is prioritized by the parameter value selector 132 in earlier iterations and exploitation is prioritized by the parameter value selector 132 in later iterations). The parameter value selector 132 can reduce the value of the gamma parameter during each iteration of the second iteration construct that starts at line 11. The parameter value selector 132 can reduce the gamma parameter to zero during a final iteration of the second iteration construct, so that in the final iteration, the parameter value selector 132 determines ucb values using only the mean values of the Gaussian model and not standard deviation values of the Gaussian model. After the gamma value is adjusted during a given iteration, the parameter value selector 132 can perform a next iteration, unless the last iteration has already been performed.

Figure 5:
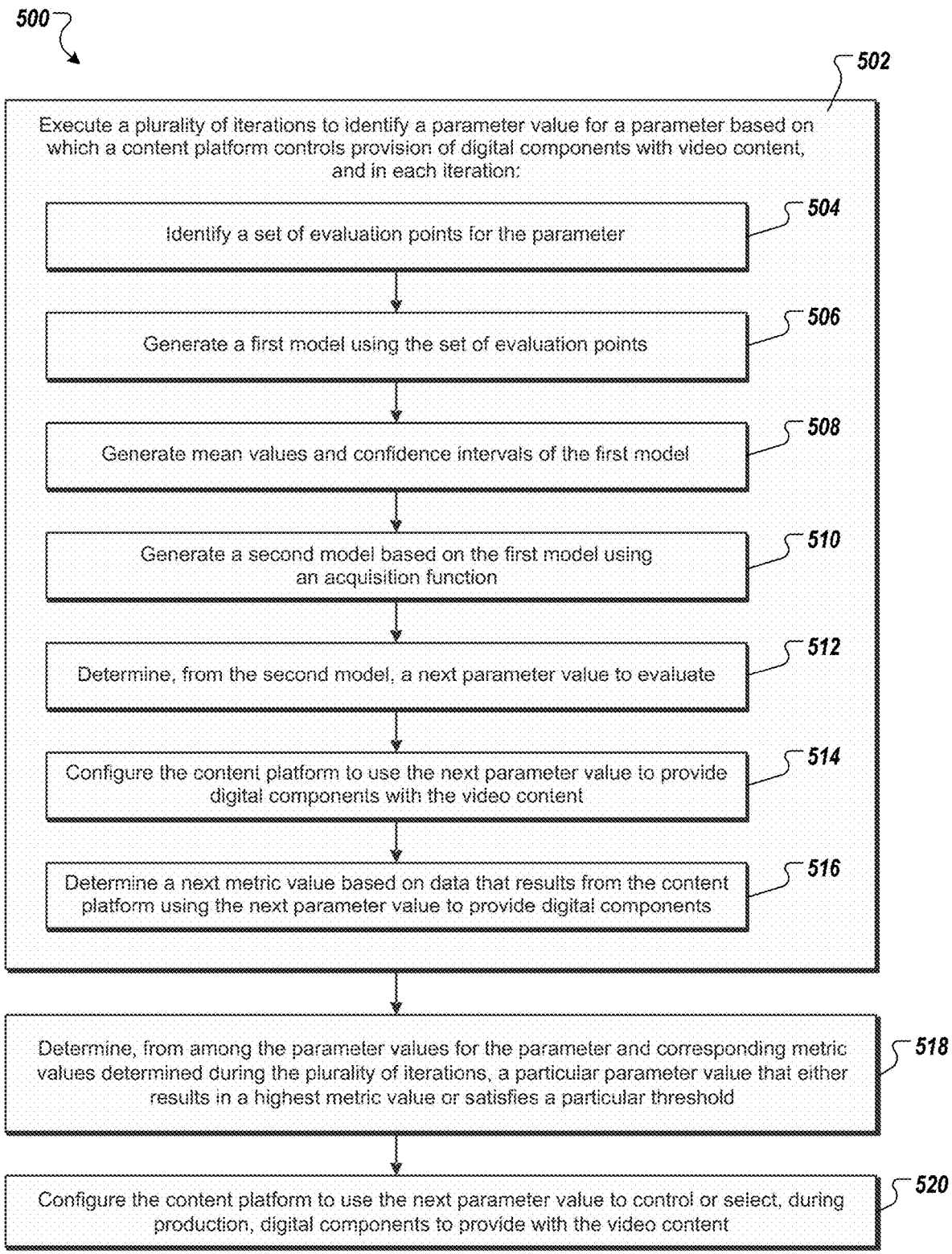
FIG. 5 is a flow diagram of an example process for automatically determining parameter values.

FIG. 5 is a flow diagram of an example process 500 for automatically determining parameter values. Operations of the process 500 are described below as being performed by the components of the system described and depicted in FIGS. 1 to 4. Operations of the process 500 are described below for illustration purposes only. Operations of the process 500 can be performed by any appropriate device or system, e.g., any appropriate data processing apparatus. Operations of the process 500 can also be implemented as instructions stored on a computer readable medium which may be non-transitory. Execution of the instructions causes one or more data processing apparatus to perform operations of the process 500.

The parameter tuning system 110 executes multiple iterations to identify a parameter value for a parameter based on which a content platform controls provision of digital components with video content (at 502). In each iteration among the multiple iterations, the parameter tuning system performs the operations 504 to 516, each of which is described below.

The parameter tuning system 110 identifies a set of evaluation points for the parameter (at 504). For example, as described above with references to FIGS. 1-4, the parameter value selector 132 identifies the evaluation points 134. Each evaluation point includes an evaluated parameter value of the parameter and a metric value of a metric corresponding to the provision of digital components by the content platform 106. The metric generator 114 determines the metric value of an evaluation point from data generated by the content platform 106 using the evaluated parameter value of the evaluation point to provide digital components during a previous experiment.

The parameter tuning system 110 generates a first model using the set of evaluation points (at 506). For example, as described above with references to FIGS. 1-4, the parameter value selector 132 can generate the first model 140, which fits the current set of evaluation points. The first model can be a Gaussian model that fits the current set of evaluation points. As another example and as described above with respect to FIG. 3A, the first model can be an aggregate model of multiple, other models, where each other model uses a different approach to fit the current set of evaluation points. The first model can include, for each parameter value, an average predicted metric value that is determined based on an average of respective predicted metric values generated by the respective other models.

The parameter tuning system 110 generates mean values and confidence intervals of the first model (at 508). For example, as described above with references to FIGS. 1-4, the parameter value selector 132 can generate the mean values 142 and the confidence intervals 144. The mean values for points other than the current set of evaluation points correspond to predicted metric values generated by the first model. The mean values for the current set of evaluation points are known metric values, rather than predicted metric values. Accordingly, confidence values for the current set of evaluation points are zero (e.g., since the metric values are known for the current set of evaluation points, the parameter tuning system can have complete confidence in the metric values for the current set of evaluation points). Confidence values for points other than the current set of evaluation points are non-zero and are higher the farther a given point is from a known current evaluation point. That is, the confidence value for a given point represents a confidence of the parameter tuning system in the predicted metric value for the point, with a higher confidence value representing a lower confidence of the parameter tuning system in the predicted metric value.

The parameter tuning system 110 generates a second model based on the first model using an acquisition function (at 510). The acquisition function is based on the mean values of the first model, the confidence intervals of the first model, and a configurable exploration weight that controls a priority of exploration for evaluating the parameter. For example, as described above with references to FIGS. 1-4, the parameter value selector 132 can generate the second model 146. The parameter tuning system 110 can use the exploration weight to control a priority of exploring new parameter values when determining, from the second model, the next parameter value to evaluate. The exploration weight can correspond to a weight of confidence intervals in the acquisition function. The exploration weight can be higher in earlier parameter evaluation iterations and lower in later parameter evaluation iterations.

The parameter tuning system 110 determines, from the second model, a next parameter value to evaluate (at 512). For example, as described above with references to FIGS. 1-4, the parameter value selector 132 can determine a next parameter value to evaluate based on a highest acquisition function value generated from the second model 146. The parameter value selector 132 can determine more than one next parameter value to evaluate. For example, the parameter value selector 132 can determine parameter values that correspond to a top predetermined number of highest acquisition function values.

The parameter tuning system 110 configures the content platform 106 to use the next parameter value to provide digital components with the video content (at 514). For example, as described above with references to FIGS. 1-4, the parameter tuning system 110 can provide the experiment file 138 to the experiment system 122 to configure the experiment system 122 to perform an experiment based on the next parameter value.

The parameter tuning system 110 determines a next metric value based on data that results from the content platform 106 using the next parameter value to provide digital components (at 516). For example, as described above with references to FIGS. 1-4, the evaluator 135 can receive the experiment metrics 130 from the content platform 106.

The parameter tuning system 110 determines, from among the parameter values for the parameter and corresponding metric values determined during the plurality of iterations, a particular parameter value that either results in a highest metric value or satisfies a particular threshold (at 518). In some implementations, and as described above with reference to FIGS. 1-4, the parameter tuning system 110 selects the parameter value from among the various parameter values for the parameter that results in the highest metric value (relative to the other metric values determined for other parameter values). Alternatively, and as also described above with reference to FIGS. 1-4, the parameter tuning system 110 selects the parameter value from among the various parameter values for the parameter that satisfies (e.g., meets or exceeds) a threshold value for the parameter.

In some implementations, the plurality of iterations is determined based on either the metric value from the current iteration satisfying (e.g., meeting or exceeding) a threshold value or a maximum number of iterations being reached.

The parameter tuning system 110 configures the content platform to use the particular parameter value (as determined at 518) to control or select, during production, digital components that are provided with the video content (at 520).

Figure 6:
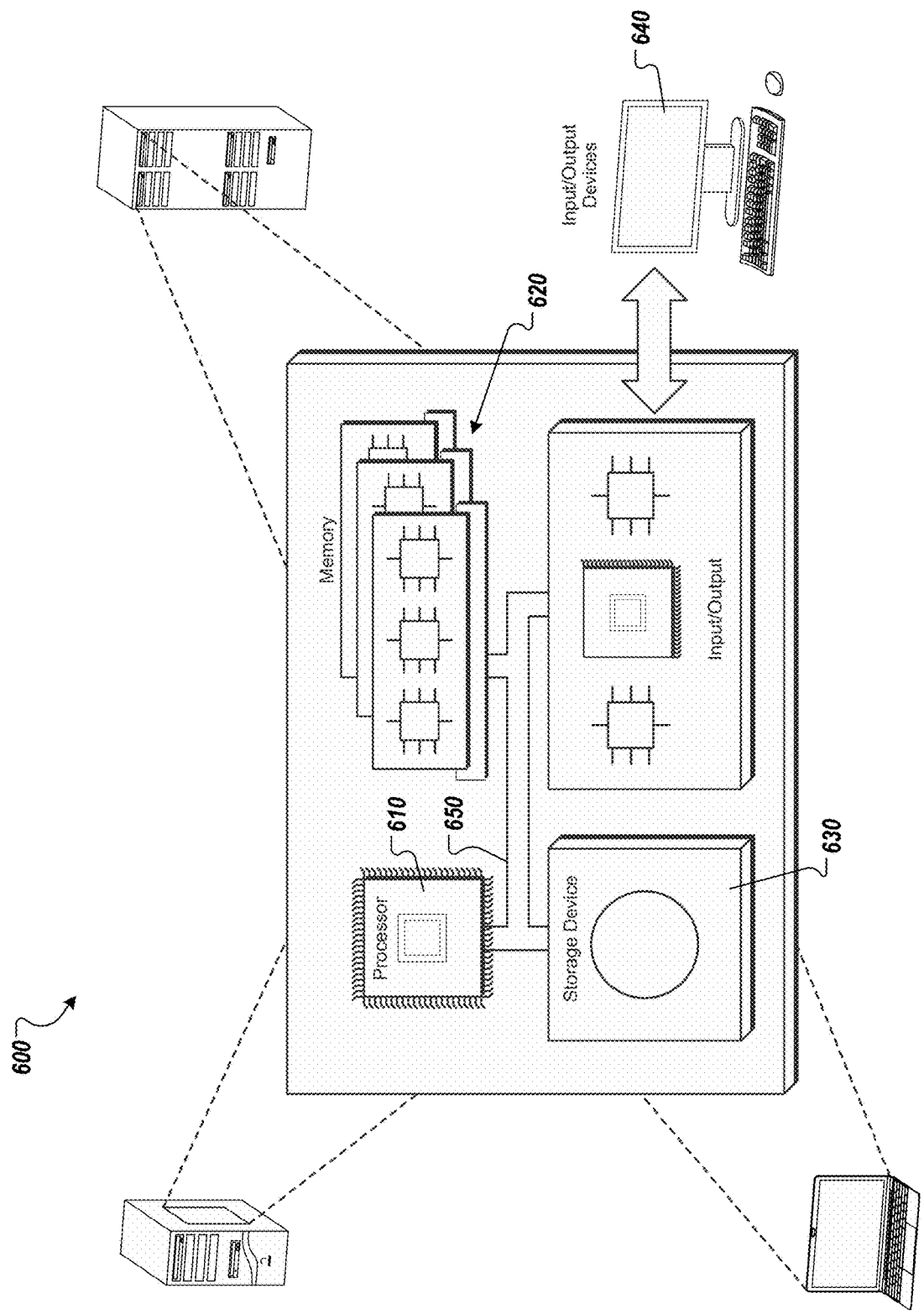
FIG. 6 is a block diagram of an example computer system that can be used to perform operations described.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to peripheral devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    executing a plurality of iterations to identify a parameter value for a parameter based on which a content platform controls provision of digital components with video content, wherein executing each iteration in the plurality of iterations includes:
        identifying a set of evaluation points for the parameter, wherein each evaluation point includes an evaluated parameter value of the parameter and a metric value of a metric corresponding to the provision of digital components by the content platform, wherein the metric value of an evaluation point is determined from data generated by the content platform using the evaluated parameter value of the evaluation point to provide digital components;
        generating a first model using the set of evaluation points;
        generating mean values and confidence intervals of the first model;
        generating a second model based on the first model and an acquisition function, wherein the acquisition function is based on the mean values of the first model, the confidence intervals of the first model, and a configurable exploration weight that controls a priority of exploration for evaluating the parameter;
        determining, from the second model, a next parameter value to evaluate;
        configuring the content platform to use the next parameter value to provide digital components with the video content; and
        determining a next metric value based on data that results from the content platform using the next parameter value to provide digital components;
    determining, from among the parameter values for the parameter and corresponding metric values determined during the plurality of iterations, a particular parameter value that either results in a highest metric value or satisfies a particular threshold; and
    configuring the content platform using the particular parameter value to control or select, during production, digital components that are provided with the video content.

2. The computer-implemented method of claim 1, further comprising determining, from the second model, at least one other parameter value to evaluate other than the next parameter value.

3. The computer-implemented method of claim 1, wherein generating the first model comprises generating the first model as a model that fits the current set of evaluation points.

4. The computer-implemented method of claim 1, wherein the exploration weight controls a priority of exploring new parameter values when determining, from the second model, the next parameter value to evaluate.

5. The computer-implemented method of claim 4, wherein the exploration weight corresponds to a weight of confidence intervals in the acquisition function.

6. The computer-implemented method of claim 1, wherein the exploration weight is higher in earlier parameter evaluation iterations and lower in later parameter evaluation iterations.

7. The computer-implemented method of claim 1, wherein each evaluation point in an initial set of evaluation points includes a randomly-generated parameter value.

8. The computer-implemented method of claim 1, wherein determining, from the second model, a next parameter value to evaluate includes determining a parameter value that has a corresponding highest acquisition function value.

9. A system, comprising:
    one or more memory devices storing instructions; and
    one or more data processing apparatus that are configured to interact with the one or more memory devices, and upon execution of the instructions, perform operations comprising:
        executing a plurality of iterations to identify a parameter value for a parameter based on which a content platform controls provision of digital components with video content, wherein executing each iteration in the plurality of iterations includes:
            identifying a set of evaluation points for the parameter, wherein each evaluation point includes an evaluated parameter value of the parameter and a metric value of a metric corresponding to the provision of digital components by the content platform, wherein the metric value of an evaluation point is determined from data generated by the content platform using the evaluated parameter value of the evaluation point to provide digital components;
            generating a first model using the set of evaluation points;
            generating mean values and confidence intervals of the first model;
            generating a second model based on the first model and an acquisition function, wherein the acquisition function is based on the mean values of the first model, the confidence intervals of the first model, and a configurable exploration weight that controls a priority of exploration for evaluating the parameter;
            determining, from the second model, a next parameter value to evaluate;
            configuring the content platform to use the next parameter value to provide digital components with the video content; and
            determining a next metric value based on data that results from the content platform using the next parameter value to provide digital components;
        determining, from among the parameter values for the parameter and corresponding metric values determined during the plurality of iterations, a particular parameter value that either results in a highest metric value or satisfies a particular threshold; and configuring the content platform using the particular parameter value to control or select, during production, digital components that are provided with the video content.

10. The system of claim 9, wherein the one or more data processing apparatus that are configured to interact with the one or more memory devices, and upon execution of the instructions, perform operations further comprising:
   determining, from the second model, at least one other parameter value to evaluate other than the next parameter value.

11. The system of claim 9, wherein generating the first model comprises generating the first model as a model that fits the current set of evaluation points.

12. The system of claim 9, wherein the exploration weight controls a priority of exploring new parameter values when determining, from the second model, the next parameter value to evaluate.

13. The system of claim 12, wherein the exploration weight corresponds to a weight of confidence intervals in the acquisition function.

14. The computer-implemented method of claim 9, wherein the exploration weight is higher in earlier parameter evaluation iterations and lower in later parameter evaluation iterations.

15. The system of claim 9, wherein each evaluation point in an initial set of evaluation points includes a randomly-generated parameter value.

16. The system of claim 9, wherein determining, from the second model, a next parameter value to evaluate includes determining a parameter value that has a corresponding highest acquisition function value.

17. A non-transitory computer readable medium storing instructions that, when executed by one or more data processing apparatus, cause the one or more data processing apparatus to perform operations, comprising:
   executing a plurality of iterations to identify a parameter value for a parameter based on which a content platform controls provision of digital components with video content, wherein executing each iteration in the plurality of iterations includes:
      identifying a set of evaluation points for the parameter, wherein each evaluation point includes an evaluated parameter value of the parameter and a metric value of a metric corresponding to the provision of digital components by the content platform, wherein the metric value of an evaluation point is determined from data generated by the content platform using the evaluated parameter value of the evaluation point to provide digital components;
      generating a first model using the set of evaluation points;
      generating mean values and confidence intervals of the first model;
      generating a second model based on the first model and an acquisition function, wherein the acquisition function is based on the mean values of the first model, the confidence intervals of the first model, and a configurable exploration weight that controls a priority of exploration for evaluating the parameter;
      determining, from the second model, a next parameter value to evaluate;
      configuring the content platform to use the next parameter value to provide digital components with the video content; and
      determining a next metric value based on data that results from the content platform using the next parameter value to provide digital components;
   determining, from among the parameter values for the parameter and corresponding metric values determined during the plurality of iterations, a particular parameter value that either results in a highest metric value or satisfies a particular threshold; and
   configuring the content platform using the particular parameter value to control or select, during production, digital components that are provided with the video content.

18. The non-transitory computer readable medium of claim 17, wherein generating the first model comprises generating the first model as a model that fits the current set of evaluation points.

19. The non-transitory computer readable medium of claim 17, wherein the exploration weight controls a priority of exploring new parameter values when determining, from the second model, the next parameter value to evaluate.

20. The non-transitory computer readable medium of claim 19, wherein the exploration weight corresponds to a weight of confidence intervals in the acquisition function.

* * * * *